United States Patent [19]
Bloom et al.

[11] 4,023,185
[45] May 10, 1977

[54] ABLATIVE OPTICAL RECORDING MEDIUM

[75] Inventors: Allen Bloom, East Windsor; Robert Alfred Bartolini, Trenton; Alan Edward Bell, East Windsor, all of N.J.

[73] Assignee: RCA Corporation, New York, N.Y.

[22] Filed: Mar. 19, 1976

[21] Appl. No.: 668,748

[52] U.S. Cl. .............................. 346/135; 8/2.5 R; 346/76 L; 427/53; 428/913
[51] Int. Cl.² .................................. G01D 15/34
[58] Field of Search ........... 346/135, 76 L; 8/2.5 R, 8/2.5 A; 427/53; 428/913, 469, 472

[56] References Cited
UNITED STATES PATENTS

| | | | |
|---|---|---|---|
| 3,651,281 | 3/1972 | Becker | 360/59 |
| 3,720,784 | 3/1973 | Maydan | 346/76 L X |
| 3,747,117 | 7/1973 | Fechter | 346/135 X |
| 3,978,247 | 8/1976 | Braudy | 8/2.5 R X |

*Primary Examiner*—Joseph W. Hartary
*Attorney, Agent, or Firm*—Glenn H. Bruestle; Birgit E. Morris

[57] ABSTRACT

An ablative recording medium comprises a substrate coated with a light reflecting coating which in turn is coated with a light absorptive layer of 4-phenylazo-1-naphthylamine formed by evaporation of Sudan Black B dyestuff. During recording, portions of the organic coating are ablated, or vaporized, by a modulated focussed light beam, thereby exposing portions of the reflective layer and recording video information as a reflective-antireflective pattern.

13 Claims, 3 Drawing Figures

ABLATIVE OPTICAL RECORDING MEDIUM

This invention relates to a novel optical recording medium. More particularly, this invention relates to an optical recording medium for ablative recording.

BACKGROUND OF THE INVENTION

Spong Ser. No. 668,495 in an application entitled "Information Record and Related Recording and Playback Apparatus and Methods" filed concurrently herewith, and incorporated herein by reference, has described an ablative recording medium which comprises a light reflective material, such as aluminum or bismuth, which is coated with a thin film of an optically absorbing organic material, such as fluorescein. A focussed modulated light beam, such as a laser beam from an argon or helium-cadmium laser, when directed at the recording medium, vaporizes or ablates the light absorbing material, leaving a hole and exposing the reflective layer. The thickness of the light absorbing layer is chosen so that the structure has minimum reflectivity. After recording there will be maximum contrast between the minimum reflectivity of the organic layer and the reflectivity of the exposed metal material. Further, when the light reflective material is itself a thin layer on a nonconductive substrate, since little energy is lost through reflection from the thin absorbing layer, and little energy is lost by transmission through the reflecting layer, the energy absorption of the light beam is concentrated into a very thin film and recording sensitivity is surprisingly high.

Ongoing work in this area has sought to improve the performance of the materials employed. Fluorescein dye, although sensitive, and producing recordings have an excellent signal to noise ratio of about 50 decibels (dB) and few, if any, dropouts or loss of signal, is hydrophilic, i.e., it absorbs moisture from the atmosphere and thus degrades after a short time at ambient atmospheric conditions. After a few days, the signal to noise ratio drops to about 35 dB and the dropouts increase to over 50 in each image. This is undesirable for commercial applications. Thus fluorescein coated recording media must be prepared shortly before use or must be carefully stored in the absence of moisture. Further, this material is soft and vulnerable to abrasion during handling. Improved organic absorbing layers should have increased toughness and should be hydrophobic, in addition to having the required optical properties such as required index of refraction and absorption coefficient.

SUMMARY OF THE INVENTION

We have discovered an improved ablative recording medium which comprises light reflecting material coated with a layer of amorphous 4-phenylazo-1-naphthylamine. This recording medium is hydrophobic, has improved resistance to abrasion and has the required optical properties so that it absorbs light of a certain wavelength.

DETAILED DESCRIPTION OF THE INVENTION

Figure 1:
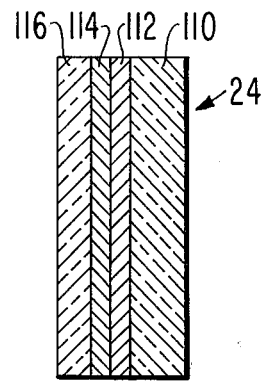
FIG. 1 is a cross sectional view of an unablated recording medium of the invention.

Sudan Black B is a well known dyestuff of the formula

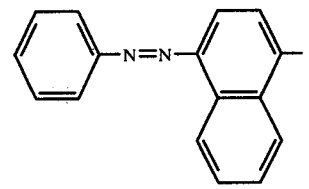

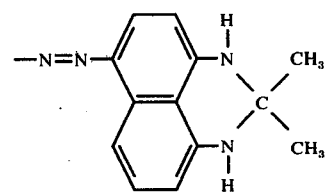

This dyestuff decomposes when evaporated to deposit as a thin film prinicipally the compound 4-phenylazo-1-naphthyl-amine which has the formula

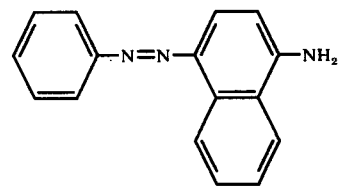

4-Phenylazo-1-naphthylamine absorbs at the 441.6 or 488.0 wavelengths emitted by the helium-cadmium and argon lasers respectively. Films of this dyestuff are relatively tough and resistant to abrasion and are hydrophobic. The index of refraction is 1.92 and the absorption coefficient of the evaporated film, K, is $7.4 \times 14^4$/cm. In accordance with the requirements described in the Spong application referred to above, a thickness of about 525 angstroms for 488.0 wavelength recording is desirable to give a minimum reflection condition when evaporated onto a layer about 300 angstroms thick of aluminum which has been oxidized to a depth of 25–30 angstroms.

A layer of amorphous 4-phenylazo-1-naphthylamine can be applied to a light reflecting material by evaporating Sudan Black B in a vacuum. Unexpectedly, although attempts to evaporate an amorphous layer of 4-phenylazo-1-naphthyl-amine directly were unsuccessful, it is deposited as a uniform amorphous thin film upon evaporation of Sudan Black B. As is explained more fully hereinafter, many dyestuffs having structures similar to Sudan Black B and to 4-phenylazo-1-naphthylamine, cannot be deposited as amorphous films of good optical quality, but crystallize or form grainy, optically scattering films which are noisy and unsuitable as high quality optical recording media.

When the light reflecting layer is a thin layer on a substrate, the nature of the substrate is not critical. The substrate should have an optically smooth, flat surface to which a subsequently applied light reflecting layer is adherent. A glass plate or disc is suitable. If the light reflecting material can be formed so it is self-sustaining and optically smooth, the need for a substrate may be dispensed with.

The light reflecting material should reflect the light used for recording. Suitable light reflecting materials include aluminum, bismuth, rhodium and the like. Preferably, the reflecting material is aluminum coated with a thin layer of aluminum oxide ($Al_2O_3$) which forms a highly reflective, inert and stable reflecting material. A reflecting material and its preparation is more fully described in copending application of Bartolini, Burke and Bloom entitled "Ablative Optical Recording Medium" Ser. No. 668,504 filed concurrently herewith.

The present organic layer can be applied by placing an evaporating boat containing Sudan Black B in a vacuum chamber. The boat is connected to a source of current. A substrate coated with an aluminum light reflecting layer is positioned above the boat. The vacuum chamber is evacuated to about $10^{-6}$ torr and current is applied to the boat to raise its temperature to about 70° C. for about 15 minutes. The current is then increased until the temperature is 150° C. when the Sudan Black B starts to evaporate. Evaporation is continued until a layer of 4-phenylazo-1-naphthylamine is deposited on the reflecting layer to the desired thickness, at which time the current is shut off and the chamber vented.

The invention will be further explained by reference to the drawings.

FIG. 1 shows a recording medium of the invention prior to exposure to a recording light beam comprising a glass substrate 110, a light reflecting layer 112 comprising a layer of aluminum about 300 angstroms thick having a top coating 14 about 30 angstroms thick of aluminum oxide and a light absorbing layer 116 of 4-phenylazo-1-naphthylamine evaporated from Sudan Black B according to the method described hereinabove.

Figure 2:
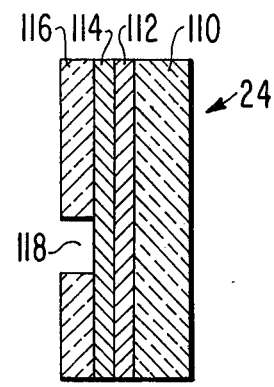
FIG. 2 is a cross section view of a recording medium of the invention after ablation.

FIG. 2 shows a recording medium of the invention after exposure to a recording light beam wherein the organic layer 116 has been ablated to leave a hole 118, exposing the reflecting layer 114. It will be understood that a recording medium after recording contains a plurality of holes 118 rather than the single one shown in FIG. 2.

Figure 3:
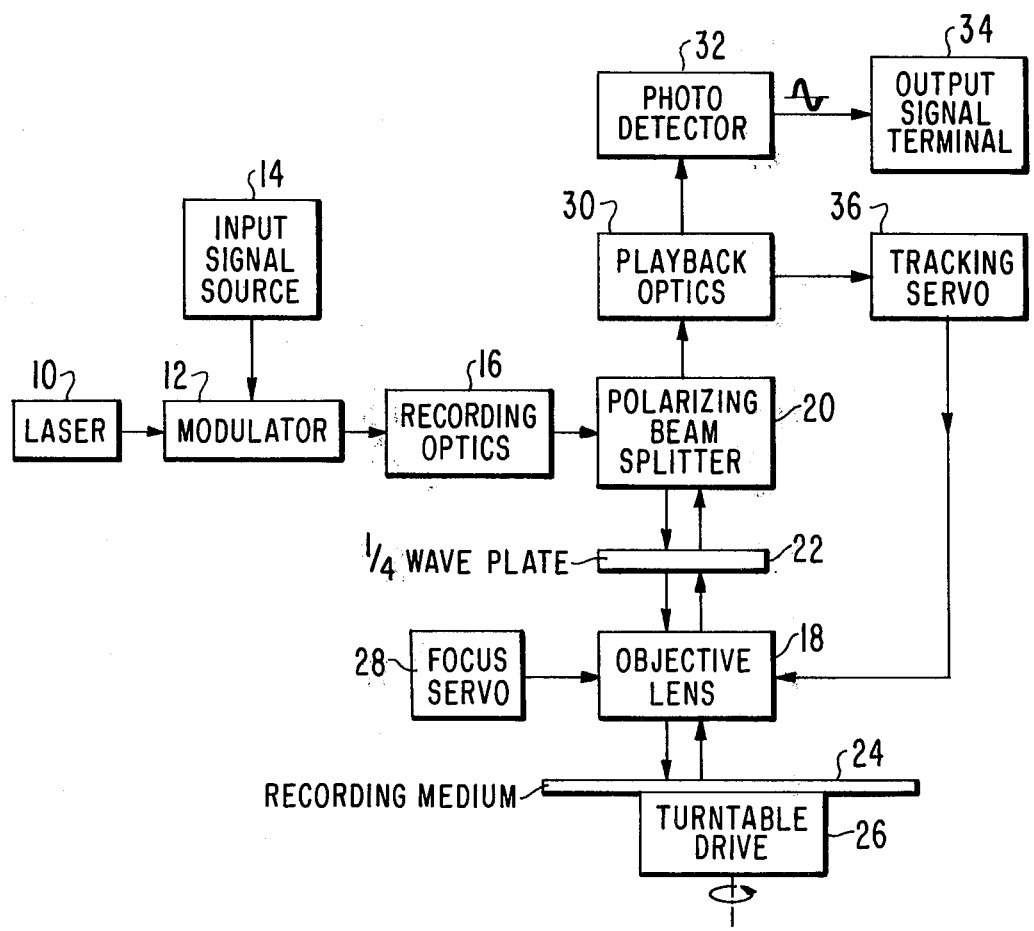
FIG. 3 is a schematic view of a system of recording and playback in which the present recording medium can be employed.

The use of the present recording medium can be explained in greater detail by referring to FIG. 3. For recording, the light emitted by a laser 10 is fed to a modulator 12 which modulates the light in response to an input electrical signal source 14. The modulated light is enlarged by recording optics 16 to increase the diameter of the intensity modulated laser beam so that it will fill the desired aperture of an objective lens 18. The enlarged modulated laser beam is totally reflected by a polarizing beam splitter 20 and passes through a beam rotating ¼ wave plate 22 to the objective lens 18. The modulated recording beam then impinges upon a recording medium 24, as described in FIG. 1, and ablates, or evaporates, a portion of the light absorbing layer to expose a portion of the reflecting layer. The recording medium 24 is rotated by the turntable drive 26 at about 1800 rpm in a spiral track. A focus servo 28 maintains a constant distance between the objective lens 18 and the surface of the recording medium 24.

For readout, an unmodulated and less intense laser beam, that is one that will not cause ablation in the recording medium, follows the same path as the recording beam to the recording medium 24. The recorded reflection-antireflection pattern modulates the reflected light back through the objective lens 18 and the ¼ wave plate 22. The light, now rotated by 90° in polarization by the two passages through the quarter wave plate 22, passes through the polarizing beam splitter 20 and is directed by playback optics 30 to a photodetector 32. The photodetector 32 converts the reflected light beam to an electrical output signal terminal 34 which corresponds to the input signal. A tracking servo 36 monitors the light through the playback optics 30 to ensure that the track in the recording medium 24 during playback is the same as that used for recording.

The invention will be further illustrated by the following examples but the invention is not meant to be limited to the details described therein.

EXAMPLE 1

A glass disc 12 inches (30.5 cm) in diameter was coated with a layer of aluminum about 300 angstroms thick. The surface was oxidized to a depth of about 30 angstroms to stabilize the metal layer.

The coated disc was rotated in a vacuum chamber above an evaporating boat containing Sudan Black B. A source of current was connected to the boat and the vacuum chamber was evacuated to about $10^{-6}$ torr. The boat was preheated with the shutter closed at about 70° C. for about 15 minutes by passing a current to the boat. The temperature was then increased to about 150° C. when the shutter was opened and Sudan Black B began to evaporate at a slow rate, about 30 angstroms per minute. Evaporation was continued until a layer of 4-phenylazo-1-naphthylamine about 525 angstroms thick was deposited over the aluminum-aluminum oxide layer.

A smooth, amorphous, clear and continuous film was deposited.

The resultant recording medium was exposed to 50 nanosecond pulses of light having a wavelength of 4880 angstroms from a laser in an apparatus as in FIG. 3. A high quality television recording was made having a signal to noise ratio of about 50 dB with few if any dropouts. Only about 1.5 milliwatts of power was required for recording. The signal holes were smooth and regular in shape.

The exposed medium was periodically read out over a period of several months. No decrease in signal to noise or increase in dropouts was noted.

COMPARATIVE EXAMPLE

The following additional dyes having structures similar to 4-phenylazo-1-naphthylamine were evaporated as in Example 1. None of these dyes could be evaporated to form amorphous, optical quality films.

TABLE

| Dye | Structure | Comments |
| --- | --- | --- |
| 1) Sudan I | | Cloudy, and grainy, not continuous film |
| 2) Sudan II | | " |
| 3) Sudan III | | " |
| 4) Sudan IV | | " |
| 5) 4-o-tolylazo-o-toluidine | | " |
| 6) 1-(1-naphthylazo)-2-naphthol | | " |
| 7) 1-(2-pyridylazo)-2-naphthol | | " |
| 8) 4-o-tolylazo-o-toluidine hydrochloride salt | | " |

TABLE-continued

| Dye | Structure | Comments |
| --- | --- | --- |
| 9) 4-phenylazo-1-naphthylamine | [structure: phenyl–N=N–naphthyl–NH₂] | " |

We claim:

1. In an ablative optical recording medium which comprises a light reflecting material coated with a light absorbing layer, the improvement which comprises employing as the light absorbing layer an amorphous layer of 4-phenylazo-1-naphthylamine.

2. A medium according to claim 1 wherein said reflecting material is aluminum.

3. A medium according to claim 1 wherein said light reflecting material is in the form of a thin layer on a substrate.

4. A medium according to claim 3 wherein said light reflecting layer is aluminum on a glass substrate.

5. A medium according to claim 3 wherein said light reflecting layer is aluminum about 250 to 500 angstroms thick which has been oxidized to a depth of about 25–30 angstroms.

6. A medium according to claim 1 wherein said 4-phenylazo-1-naphthylamine layer is about 525 angstroms thick.

7. A medium according to claim 5 wherein said 4-phenylazo-1-naphthylamine layer is about 525 angstroms thick.

8. A medium according to claim 1 wherein portions of said light reflecting material are exposed to form a light reflecting-light absorbing pattern corresponding to video information.

9. A medium according to claim 3 wherein portions of said light reflecting material are exposed to form a light reflecting-light absorbing pattern corresponding to video information.

10. A medium according to claim 5 wherein portions of said light reflecting material are exposed to form a light reflecting-light absorbing pattern corresponding to video information.

11. A medium according to claim 7 wherein portions of said light reflecting material are exposed to form a light reflecting-light absorbing pattern corresponding to video information.

12. A method of making an optical recording medium which comprises
    evaporating a layer of aluminum about 250 to about 500 angstroms thick onto a substrate under vacuum,
    oxidizing said aluminum layer to a depth of from about 25 to about 30 angstroms, and
    evaporating Sudan Black B dyestuff under vacuum to form a layer of 4-phenylazo-1-naphthylamine on said oxidized aluminum layer.

13. A method according to claim 12 wherein said 4-phenylazo-1-naphthylamine layer is about 525 angstroms thick.

* * * * *

Disclaimer 4,023,185.—*Allen Bloom*, East Windsor, *Robert Alfred Bartolini*, Trenton, and *Alan Edward Bell*, East Windsor, N.J. ABLATIVE OPTICAL RECORDING MEDIUM. Patent dated May 10, 1977. Disclaimer filed June 22, 1978, by the assignee, *RCA Corporation*.

Hereby enters this disclaimer to claims 7, 10, 11 and 13 of said patent.

[*Official Gazette August 22, 1978.*]